(12) United States Patent
Itskovich et al.

(10) Patent No.: US 9,482,777 B2
(45) Date of Patent: Nov. 1, 2016

(54) TRANSIENT ELECTROMAGNETIC TOOL MOUNTED ON REDUCED CONDUCTIVITY TUBULAR

(71) Applicant: BAKER HUGHES INCORPORATED, Houston, TX (US)

(72) Inventors: Gregory B. Itskovich, Houston, TX (US); Steven A. Morris, Spring, TX (US); Teruhiko Hagiwara, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 93 days.

(21) Appl. No.: 14/186,789

(22) Filed: Feb. 21, 2014

(65) Prior Publication Data

US 2015/0241592 A1 Aug. 27, 2015

(51) Int. Cl.
*G01V 3/26* (2006.01)
*G01V 3/28* (2006.01)

(52) U.S. Cl.
CPC .. *G01V 3/26* (2013.01); *G01V 3/28* (2013.01)

(58) Field of Classification Search
None
See application file for complete search history.

(56) References Cited

U.S. PATENT DOCUMENTS

| | | | |
|---|---|---|---|
| 5,939,885 A | 8/1999 | McClure et al. | |
| 7,046,009 B2 | 5/2006 | Itskovich | |
| 7,150,316 B2 | 12/2006 | Itskovich | |
| 7,167,006 B2 | 1/2007 | Itskovich | |
| 7,994,790 B2 | 8/2011 | Itskovich et al. | |
| 8,035,392 B2 | 10/2011 | Itskovich et al. | |
| 8,049,507 B2 | 11/2011 | Rabinovich et al. | |
| 8,239,172 B2 | 8/2012 | Reiderman et al. | |
| 8,278,930 B2 | 10/2012 | Itskovich | |
| 8,332,152 B2 | 12/2012 | Itskovich et al. | |
| 2007/0108981 A1 | 5/2007 | Banning-Geertsma et al. | |

(Continued)

FOREIGN PATENT DOCUMENTS

WO 2013095764 A1 6/2013

OTHER PUBLICATIONS

Author Unknown, "Carbon-Fiber-Drill-Pipe Passes Tests," Oil and Gas Journal, vol. 101, Issue No. 8, retrieved on Sep. 9, 2014 from the internet: http://www.ogj.com/articles/print/volume-101/issue-8/drilling-production/carbon-fiber-drill-pipe-passes-tests.html (2003).

(Continued)

*Primary Examiner* — Paresh Patel
(74) *Attorney, Agent, or Firm* — Mossman Kumar & Tyler PC

(57) ABSTRACT

Systems, devices, and methods for evaluating an earth formation. Apparatus may include a carrier configured for conveyance in a borehole including a conducting tubular comprising a reduced conductivity portion made of reduced conductivity material adjacent at least one of (i) at least one transmitter antenna, and (ii) at least one receiver antenna on the carrier. The material may be a composite and may have a resistivity of between $10^{-4}$ and $10^2$ ohm-meters. Methods and apparatus may be configured for producing time-dependent transient electromagnetic (TEM) signals using the transmitter(s) and receiver(s) and estimating a value of a resistivity property using the signals. The apparatus may be used in drilling and may include a bottom hole assembly with a drill bit, and the value may be indicative of a portion of the earth formation ahead of the bit. The value may be used to conduct further operations in a borehole, including geosteering.

17 Claims, 5 Drawing Sheets

(56) References Cited

U.S. PATENT DOCUMENTS

| | | |
|---|---|---|
| 2010/0097065 A1 | 4/2010 | Itskovich et al. |
| 2011/0257886 A1 | 10/2011 | Itskovich et al. |
| 2012/0059586 A1 | 3/2012 | Itskovich et al. |
| 2012/0242342 A1 | 9/2012 | Rabinovich et al. |
| 2013/0066559 A1 | 3/2013 | Fang |

OTHER PUBLICATIONS

ISR and Written Opinion in PCT/US2015/016503 dtd May 26, 2015.

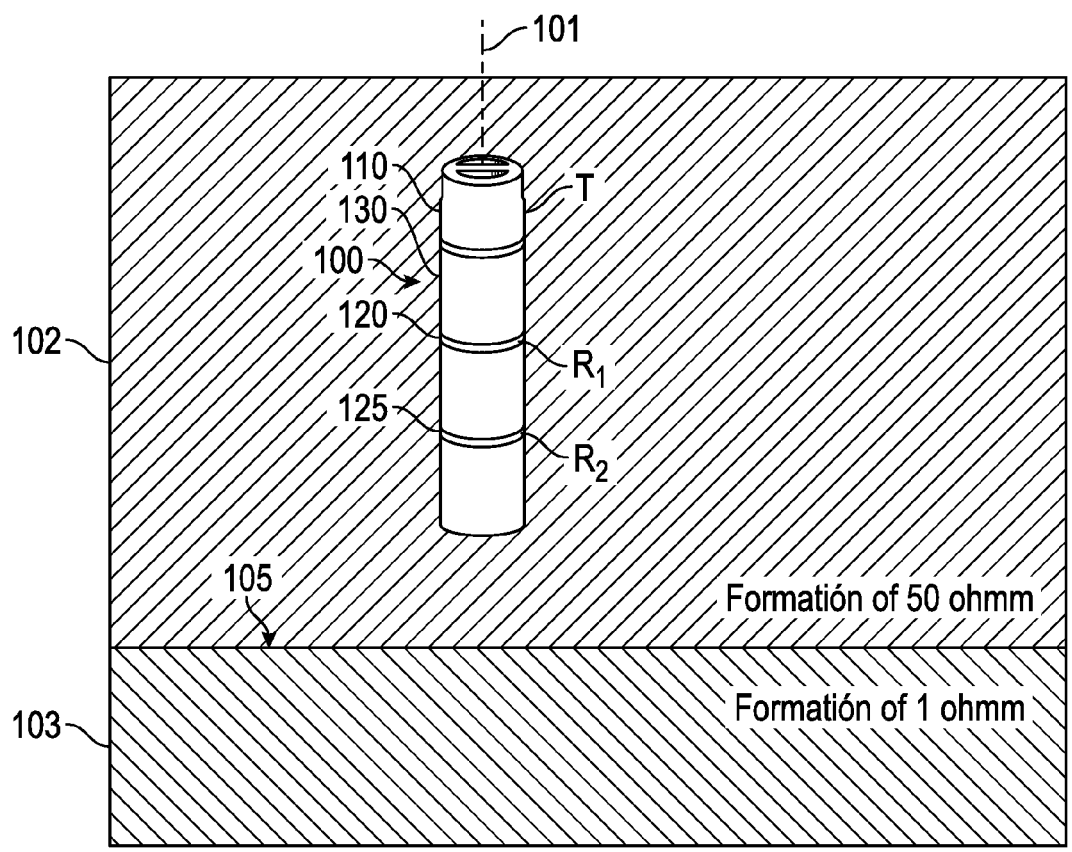
FIG. 1A
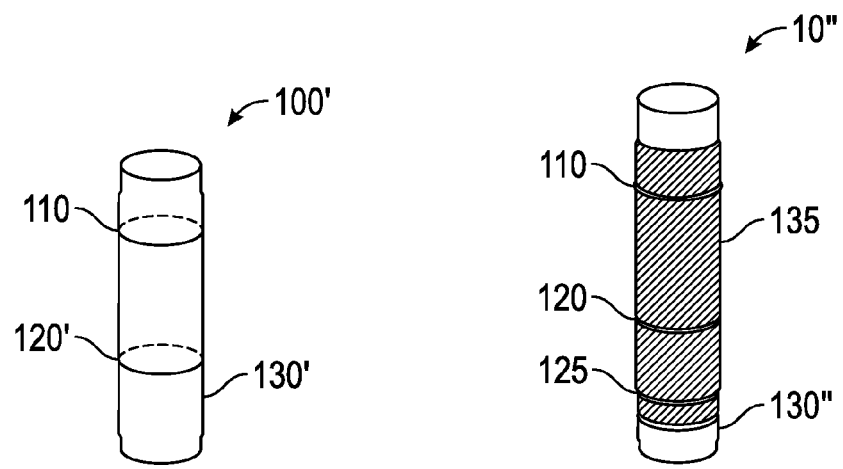
FIG. 1B        FIG. 1C

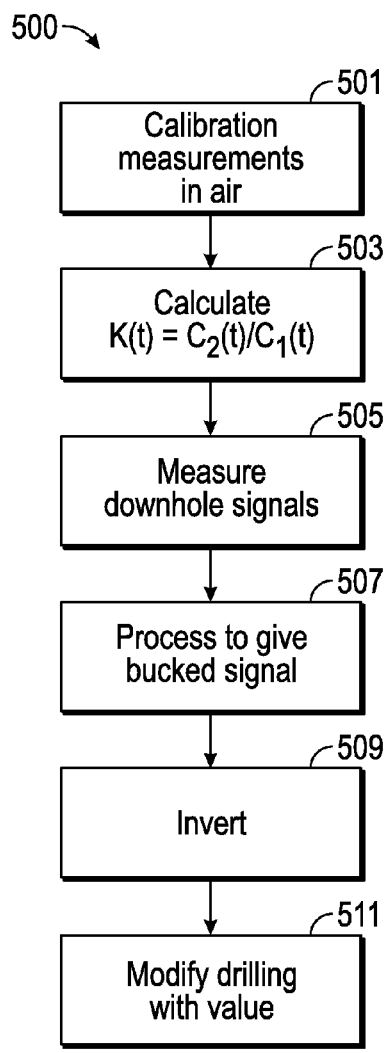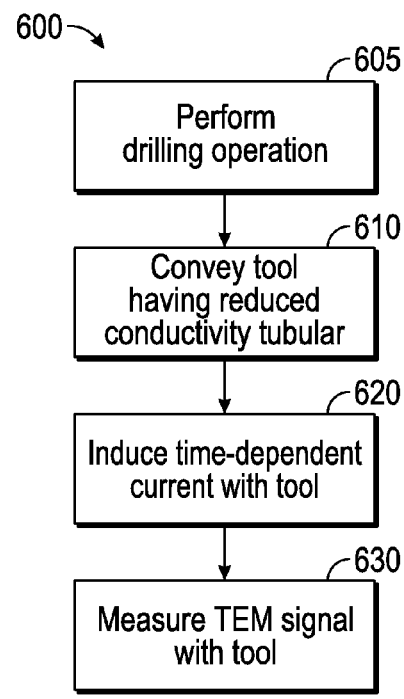
FIG. 5
FIG. 6

TRANSIENT ELECTROMAGNETIC TOOL MOUNTED ON REDUCED CONDUCTIVITY TUBULAR

FIELD OF THE DISCLOSURE

In one aspect, the present disclosure generally relates to methods, systems, and devices for electromagnetic well logging. More specifically, aspects of the present disclosure relate to measurements using transient electromagnetic signals.

BACKGROUND OF THE DISCLOSURE

Geologic formations are used for many purposes such as hydrocarbon and water production. Boreholes are typically drilled into the earth in order to intersect and access the formations.

Electromagnetic induction resistivity instruments have been used for some time to determine the electrical conductivity of earth formations surrounding a wellbore. More recently, development of deep looking tools based on transient field behavior, which may capable of formation evaluation at distances ranging from tens to hundreds of meters, has been attempted. In transient electromagnetic (TEM) methods, voltage or current pulses that are excited in a transmitter initiate the propagation of an electromagnetic signal in the earth formation. The transmitter and receiver may be at the surface or within the wellbore. Electric currents diffuse outwards from the proximity of the transmitter into the surrounding formation. At different times, information arrives at the measurement sensor predominantly from different investigation depths. Generally, early-time signals predominantly relate to near-zone responses (lesser depths of investigation) and late-time signals predominantly relate to remote-zone responses (greater depths of investigation).

SUMMARY OF THE DISCLOSURE

Aspects of the present disclosure include systems, methods and devices for evaluating an earth formation intersected by a borehole. Apparatus embodiments include a carrier configured to be conveyed in a borehole, the carrier including a conducting tubular; at least one transmitter on the conducting tubular configured to induce a current in the earth formation upon activation in the borehole; at least one receiver on the conducting tubular configured to receive a corresponding transient signal induced by the earth formation responsive to the current; and at least one processor configured to: estimate a value of a resistivity property of the earth formation using the corresponding transient signal responsive to a transient activation of the at least one transmitter antenna; and wherein the conducting tubular comprises a reduced conductivity portion adjacent to (i) the at least one transmitter antenna, and (ii) the at least one receiver antenna, and wherein the reduced conductivity portion comprises a reduced conductivity material.

The reduced conductivity portion may be substantially all of the conducting tubular. The reduced conductivity portion may include at least one insert on the conducting tubular. The reduced conductivity material may have a resistivity of between 10-4 ohm-meters and 102 ohm-meters. The reduced conductivity material may be configured to operate in the borehole at a 1600 kN operating tensile load and a 65 kN torsional load. The reduced conductivity material may be configured to operate in the borehole at an internal pressure of at least 65 mPa and a temperature of 150 degrees Celsius. The reduced conductivity material may be anisotropic with regard to resistivity. The reduced conductivity material may be a composite material. The reduced conductivity material may include at least one of: i) carbon fibers; and ii) carbon tapes. The reduced conductivity material may be low-frequency non-conductive. The reduced conductivity material may be non-metallic. The resistivity property of the earth formation may be selected from (e.g., one of): (i) a resistivity of the formation, (ii) a conductivity of the formation, and (iii) a dielectric constant of the formation.

The carrier may include a bottomhole assembly including a drill bit. The resistivity property of the earth formation may be a distance to an interface in the earth formation, and the at least one processor may be configured to control a direction of drilling of the bottomhole assembly using the estimated value of the distance to the interface. The at least one processor may be further configured to estimate the resistivity property for a portion of the earth formation ahead of the drill bit.

Alternatively, or additionally, the at least one processor may be further configured to estimate the value of the resistivity property of the earth formation by performing an inversion using a 1-D model without using a representation of the conducting tubular. The at least one transmitter and the at least one receiver may be placed on the same insert of the at least one insert. The apparatus may include at least two spaced-apart receiving antennas, wherein the at least one processor is configured to estimate the value of the resistivity property of the earth formation using first and second transient signals from a first one and a second one of the at least two spaced-apart receiver antennas, respectively, each responsive to a transient activation of the at least one transmitter antenna. The at least one processor may be configured to estimate the resistivity property of the earth formation using first and second transient signals to derive a bucked signal substantially unaffected by the tubular.

Method embodiments may include conveying a carrier in a borehole, the carrier including a conducting tubular having at least one transmitter and at least one receiver on the conducting tubular, wherein the conducting tubular comprises a reduced conductivity portion adjacent at least one of (i) the at least one transmitter antenna, and (ii) the at least one receiver antenna, the reduced conductivity portion comprising a reduced conductivity material; inducing a current in the earth formation; receiving a corresponding transient signal induced by the earth formation responsive to the current; and using at least one processor to estimate a value of a resistivity property of the earth formation using the corresponding transient signal.

Example features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIGS. 1A-1C illustrate tools for use in transient electromagnetic (TEM) logging in accordance with embodiments of the present disclosure;

FIG. 5 illustrates a method for estimating a property of the earth formation in accordance with embodiments of the present disclosure; and FIG. 6 illustrates a method for making a transient measurement in accordance with embodiments of the present disclosure.

DETAILED DESCRIPTION

Figure 2:
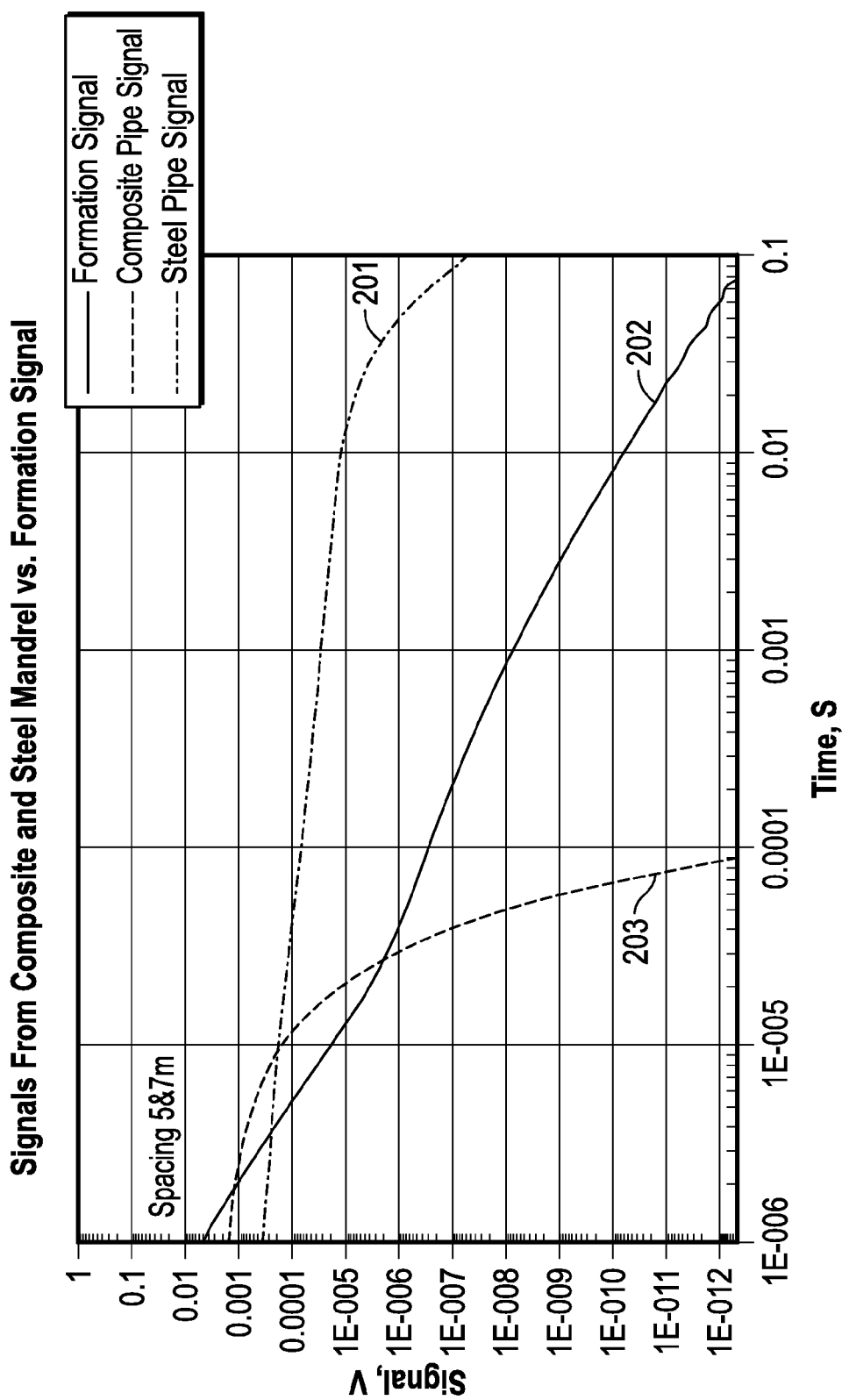
FIG. 2 illustrates modeled responses of a coaxial (ZZ) tool having a steel mandrel.

Aspects of the present disclosure relate to apparatuses and methods for electromagnetic induction well logging for evaluating an earth formation. Some aspects relate particularly to estimating properties of the formation relating to transient electromagnetic (TEM) measurements. The formation may be intersected by a wellbore which is formed by a bottom hole assembly ('BHA') of a drill string. The TEM measurements are taken in the wellbore, and may be used to estimate a parameter of interest. More specifically, the present disclosure relates to tool structures enabling deep measurement-while-drilling ('MWD') resistivity measurements suitable for geo-steering and measurements ahead of the bit.

Aspects of the present disclosure mitigate parasitic effects of a tubular (e.g. drillpipe, drill collar) in the drillstring while maintaining robustness of the tubular. Further aspects may include a carrier including a tubular comprising composite materials having an appropriate combination of strength, wear, and electrical conductivity characteristics so as to be suitable for deep transient electromagnetic (TEM) measurements in MWD applications.

One aspect of measurement-while-drilling (MWD) applications is the estimation of the distance from the drillbit to an interface in the earth formation that has a resistivity contrast across the interface. The interface may be a bed boundary and/or a fluid interface between a nonconducting fluid (e.g., a hydrocarbon) and a conducting fluid (e.g., brine).

The present disclosure is susceptible to embodiments of different forms. There are shown in the drawings, and herein will be described in detail, specific embodiments of the present disclosure with the understanding that the present disclosure is to be considered an exemplification of the principles of the present disclosure and is not intended to limit the present disclosure to that illustrated and described herein.

Transient electromagnetic (TEM) tools are configured to effect changes in a transmitter to induce a time-dependent current in a formation. Transient signals occur in the receiver antennas, which are induced by the eddy currents in the formation. The induced signal contains information about formation characteristics. Thus, the receiver produces a response indicative of formation characteristics, such as, for example, a resistivity property of the formation. Electronics may be configured to measure the time-dependent transient electromagnetic (TEM) signal induced by the eddy currents in the formation.

In a typical transient induction tool, a magnetic dipole is abruptly reversed at the transmitter loop. For example, current in a transmitter coil drops from its initial value $I_0$ to 0 at the moment t=0. Subsequently, measurements are taken while the rotating tool is moving along the borehole trajectory. The currents induced in the formation and the drillpipe begin diffusing from the region close to the transmitter coil in all the directions surrounding the transmitter. These currents induce electromagnetic field components which can be measured by receivers (e.g., induction coils) placed along the conductive pipe at some distance from the transmitter.

It would be desirable to have deep transient measurements (i.e., greater than 30 meters) for geosteering and other purposes. Currently, the main obstacles preventing deep geo-steering beyond 30 meters using transient electromagnetic measurements are caused by the presence of the ubiquitous metal drillpipe; typically, drilling tubular is made of steel. Signal contributions due to the eddy currents in the pipe are parasitic. The signal due to these currents can be much larger (by several orders of magnitude) than the signal from the formation. Metallic tubular also results in reduced magnetic moment of the transmitters and receivers. Further, interference between the tubular signal and the formation signal significantly increases the complexity of interpreting the information obtained from the signals.

The measured transient signal is severely affected by the eddy currents in the pipe that limit resolution of the measurements of the formation parameters, such as, for example, distance to a resistivity boundary. By maximizing the distance between transmitter and receiver it is possible to reduce the influence of the drillpipe signal while increasing the contribution of the signal from the formation. However, such systems result in a limited resolution with respect to the parameters of interest, and the dimensional requirements of such systems (up to 30 meters) may be prohibitive for MWD applications. It would be desirable to reduce the parasitic signals caused by eddy currents in the drilling tubular in transient field signal detection methods at lesser distances between transmitter and receiver.

In the case of measurements ahead of the bit, positioning of the induction system with respect to the drill bit presents another complication. The first 3-4 meters in the vicinity of the drill bit are not available for transmitter/receiver placement, because equipment supporting the drilling process occupies this space. If it is desirable to look about 5 meters ahead of the bit, the transmitter/receiver system would be separated from the region of interest by 8-9 meters of distance, but none of the existing resistivity tools compatible with MWD are capable of reliable measurement at such depth of investigation.

Until this point, it was considered necessary to use non-conducting (or substantially non-conducting) materials in the tubular to achieve sufficient reduction in the parasitic effect to allow the desired deep TEM measurement. Glass fiber composites are one example. However, after extensive search, no substantially non-conducting materials have been found which meet the strength and robustness requirements for drilling-related tubular. For example, glass fiber composites have severe problems under drilling conditions because they tend to quickly deteriorate in hot, wet environments.

The present disclosure relates to the use of reduced conductivity materials for tubular in connection with drilling. As used herein, reduced conductivity material is defined as materials having a resistivity between $10^{-4}$ ohm-meters and $10^2$ ohm-meters. To reduce the parasitic effect of currents in the conducting tubular, techniques are described herein employing a conducting tubular comprising a reduced conductivity portion adjacent at least one of (i) the at least one transmitter antenna, and (ii) the at least one receiver antenna. The reduced conductivity portion comprises a reduced conductivity material. For example, the reduced conductivity portion may be made of a reduced conductivity material, meaning that the electrical properties, such as, for example, resistivity, of the portion is characteristic of the material. That is, the reduced conductivity portion, as a whole, has a resistivity between $10^{-4}$ ohm-meters and $10^{2}$ ohm-meters. In some embodiments, the reduced conductivity portion may comprise all or substantially all of the tubular. In other embodiments, the portion may be an insert in the tubular. The term insert is used in contrast with coatings that may be applied to a tubular. It should be noted that resistivity values, as used herein, refer to the resistivity values at a respective frequency of operation.

The reduced conductivity material of the reduced conductivity portion mitigates intensity of the eddy currents in the vicinity of both transmitter and receivers and, as a result, diminishes the parasitic effect from the tubular. Additional mitigation of the parasitic effect may be achieved by using two receivers and performing bucking to suppress the tubular signal and recover the formation signal.

Reduced conductivity materials may be contrasted with conductive materials, defined as having a resistivity less than $10^{-5}$ ohm-meters (e.g., copper, silver, steel, etc.), and with substantially non-conductive materials defined as having a resistivity above $10^{3}$ ohm-meters (e.g., ferrite). In some embodiments, the material may have a resistivity between $10^{4}$ ohm-meters and $10^{-2}$ ohm-meters. In one particular embodiment, the material may be approximately 1000 times more resistive than steel.

Example reduced conductivity materials include composite materials, powdered metals, and so on. One specific type of composite materials includes carbon-reinforced composite materials. The resistivity and strength of carbon reinforced composite materials are typically linked to the amount of carbon fiber (or carbon tape) used in the composite. These materials have conductive carbon filaments embedded in their matrix material (e.g., resin), which makes them slightly conductive. Typically, both strength and conductivity will generally increase with the percentage of carbon fiber. The conductivity in such materials is highly anisotropic, however, with maximum conductivity being parallel to the carbon filaments, and minimum conductivity perpendicular to the filaments.

Alternative carbon fiber materials may employ designs where carbon filaments can be laid down in such a way that they are insulated from each other, resulting in tool bodies that are essentially non-conducting at low frequencies (e.g., 1 kHz), but reduced conductivity at higher frequencies (e.g., 10 MHz). Recently, materials incorporating meshes of glass fiber and carbon fiber have been developed.

Commercially available composites, particularly carbon fiber reinforced composites (e.g., fiber in resin matrix), may have mechanical properties sufficient for use as drilling tubular in downhole applications. For example, for composite tubular of lengths up to 30 feet having an outer diameter of 6 to 7.5 inches and an inner diameter of 2-5 inches, the tubular may be configured for 1200-2200 kN operating tensile load, 40-75 kN torsional load, internal pressure of 60-75 mPa, and operating temperature of 125-250 degrees Celsius. Such a composite tubular may be configured for 20 g vibration, 50 g impact strength, torque of 5-15 kN/meter, compressive force of 800-1000 kN, and tensile strength of 1000-1500 kN. The tubular may tolerate a wellbore bend of 1-4 degrees per 25 meters during rotation for 1-5 million rotations, and may tolerate higher sliding bend angles. In one example embodiment, the composite tubular may be configured for at least 1600 kN operating tensile load, at least 65 kN torsional load, internal pressure of at least 65 mPa, and operating temperature of 150 degrees Celsius. In other embodiments, the tubular may be configured for a compressive force of 900 kN or more, and/or have a tensile strength of at least 1200 kN.

FIGS. 1A-1C illustrate tools for use in transient electromagnetic (TEM) logging according to embodiments of the present disclosure. Referring to FIG. 1A, tool 100 includes a tubular 130 substantially entirely comprised of a reduced conductivity material. The tool may include a transmitter 110 and receivers 120 and 125 disposed along tubular 130. Other embodiments may include additional transmitters or receivers. The transmitter 110 may be configured to induce a time-dependent current in the formation. For example, the transmitter 110 may include an antenna coil coupled with a current source. The receivers 120, 125 may be configured to convert a time-dependent transient electromagnetic signal induced by the formation responsive to the current into an output signal. The tool 100 may be configured to cause the transient electromagnetic signal by abruptly changing a magnetic moment of the transmitter 110. This may be carried out by switching a current on and off in the transmitter coil to generate pulses. The transmitter 110 may include an antenna coil coupled with a current source and a magnetic core having residual magnetization. Switching current in the antenna coil results in magnetization reversal in the magnetic core and change in magnetic dipole moment of the antenna. Some embodiments may include an induction antenna for both transmitting and receiving signals and/or one or more bucking coils or other bucking components.

Many variations in transmitter and receiver configurations may be successfully employed. Transmitters and receivers may vary in number, location (e.g., with respect to the tool, to one another, to the drill bit, and so on) and orientation (e.g., transverse, longitudinal, tilted, etc.).

In operation, tool 100 is configured to effect changes in the transmitter to induce a time-dependent current in the formation. Transient signals occur in the receiver antennas that are induced by the formation responsive to the current. The induced signal contains information about formation characteristics. Thus, the receiver produces a response indicative of formation characteristics, such as the parameter of interest. A processor is configured to measure the time-dependent transient electromagnetic (TEM) signal induced by the formation.

In other embodiments, the tool may include a single receiver (no bucking coil) and proceed with one receiver at reduced or zero (coincided system) spacing. In some implementations, non-conductive inserts may be used.

As modeled, TEM tool 100 lies next to a formation interface 105. Transmitter 110 and receivers 120, 125 lie along a common axis 101 that is horizontally positioned in the upper half-space 102 perpendicular to the interface and is separated by a distance from the interface. In this example, the transmitter-receiver spacing is 5 and 7 meters, respectively. The term "interface" includes a fluid interface between two different fluids in an earth formation (e.g., a fluid front) as well as a boundary between two different geologic or stratigraphic intervals in the earth (e.g., distance to bed). Examples following use distance to bed for convenience of illustration, but it should be readily apparent that embodiments wherein distance to an interface of a different type is estimated are within the scope of the disclosure. The upper half-space 102 has a resistivity of 50 Ω-m and the remote formation (lower half-space) 103 is shown to have a resistivity of 1 Ω-m. It should be noted that the coaxial transmitter-receiver configuration shown herein is not to be construed as a limitation and any suitable arrangement including but not limited to an arrangement having a transverse transmitter and/or a transverse receiver may be used.

We present numerical modeling results in the case of the transient system placed in a vertical well in two-layered formation for both a traditional steel mandrel and the reduced conductivity composite of tubular 130 in tool 100 above. The tool is placed in the resistive upper half-space of 50 ohm-m having boundary with 1 ohm-m half-space placed at the distance of 16 m below the drill bit.

The parameters of the model used in the modeling were the following:

Pipe radius=7 cm
Pipe thickness=3 cm
Conductivity of steel drill=1.4 E+06 (ohm-m)$^{-1}$
Conductivity of composite drill=1.4 E+03 (ohm-m)$^{-1}$
Transmitter/Receiver coils radius=8.5 cm.

FIG. 2 illustrates modeled responses of a coaxial (ZZ) tool having a steel mandrel in contrast with those of a coaxial tool having a reduced conductivity material (as in FIG. 1) in accordance with aspects of the present disclosure as measured at the 7 meter receiver coil. Responses are measured (in Volts) as the ordinate and the time is shown (in seconds) as the abscissa. The response of the formation 202 is the same in both cases. However, it is readily apparent the response attributable to the traditional steel tubular 201 is much larger than the response attributable to the reduced conductivity material (e.g. composite) tubular 203.

It is readily apparent from FIG. 2 that the response attributable to the reduced conductivity material tubular decays much faster compared to the response attributable to the steel tubular, and it is much smaller than the signal from the formation. This enables transient measurements up to several milliseconds, which will translates to three times increased depth of investigation for geo-steering. Under favorable conditions, the oil-water boundary can be detected at the distance of 100 meters from the tool.

Figure 3:
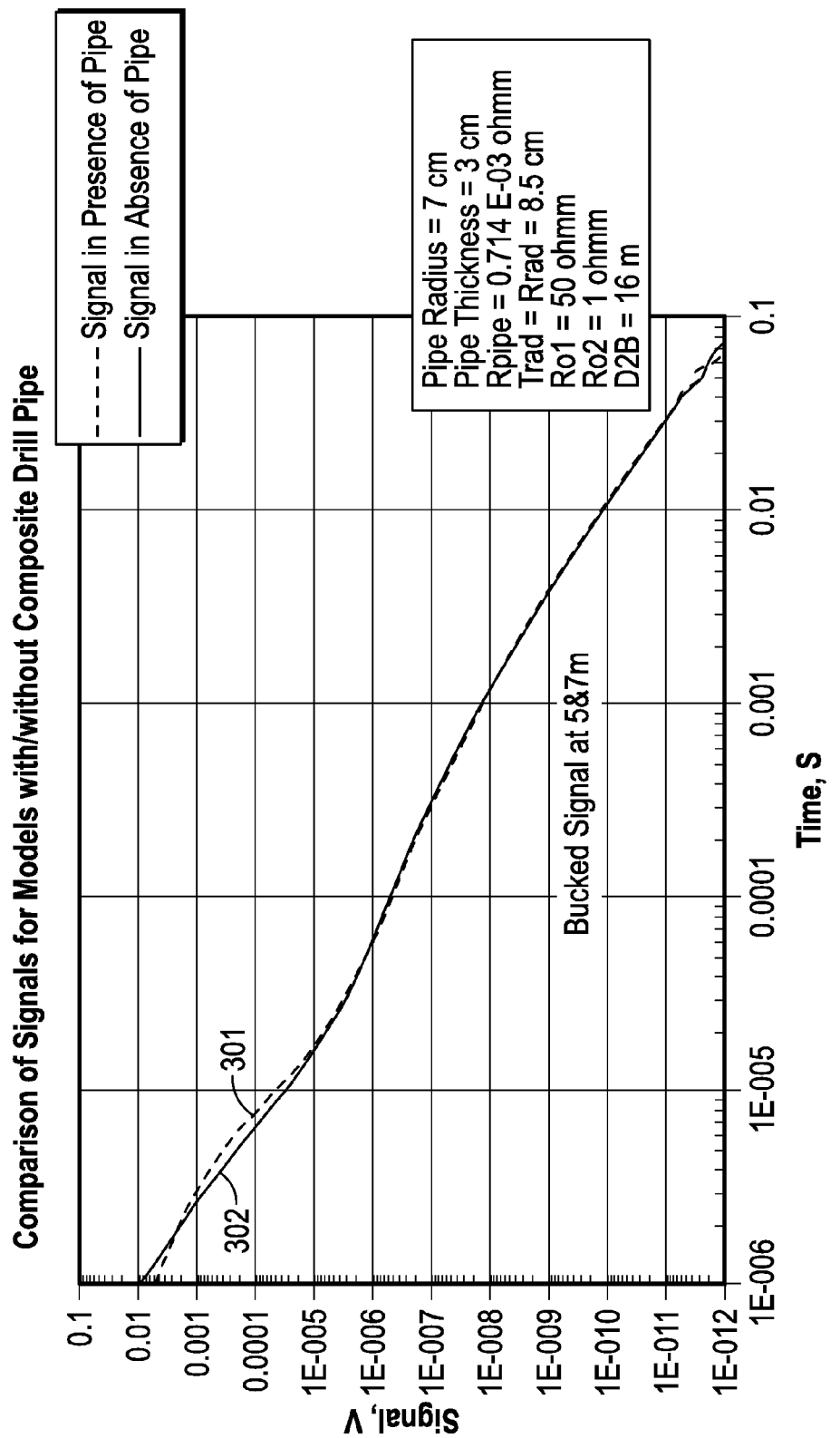
FIG. 3 illustrates bucked responses of a coaxial (ZZ) tool having a reduced conductivity material in accordance with aspects of the present disclosure.

FIG. 3 illustrates bucked responses of a coaxial (ZZ) tool having a reduced conductivity material (as in FIG. 1) in accordance with aspects of the present disclosure normalized by the corresponding transmitter/receiver moments. Here the signal from the composite pipe is additionally suppressed by combining responses at the 7-meter and 5-meter receiver signals using a bucking coefficient K derived from the cube of the receiver spacing ratio (e.g., $(5/7)^3$, or approximately 0.3644). Curve 301 shows the response when a composite drillpipe is present, while curve 302 shows the response if no drillpipe is present. As can be seen from FIG. 3, the two normalized signals coincide over almost all the time interval of interest. This suggests that the bucked signal for the model with the composite drill pipe has the same shape as the signal in the absence of drillpipe, and 1D responses (models with no drill collar) can be used for interpretation of the 2D (or 3D) responses (models with pipe and inserts)—an important practical fact, since modeling of 1D response is much simpler to perform compared to modeling of 2D/3D response. For example, an inversion of the formation model exclusive of the tubular can be used, which greatly simplifies forward modeling. In contrast, in the case of a steel drill collar, there tends to be an interaction between eddy currents in the pipe and the formation. This interaction makes inversion more difficult and costly to perform.

The unpredicted, and surprising, result obtained from the models of FIGS. 2 & 3 is that reduced conductivity materials are sufficient to reduce parasitic effects—non-conductive materials are not required. By determining that reduced conductivity materials have appropriate electromagnetic properties for use in a drilling tubular in the TEM MWD context, the number of acceptable materials is greatly increased, and allows selection of materials that have vastly improved strength and wear characteristics. Materials may then be selected for use based on suitable strength and wear properties in combination with reduced conductivity. Suitable materials may have strength and wear properties approximating steel, or may otherwise be suited for use in typical drilling systems.

Figure 4:
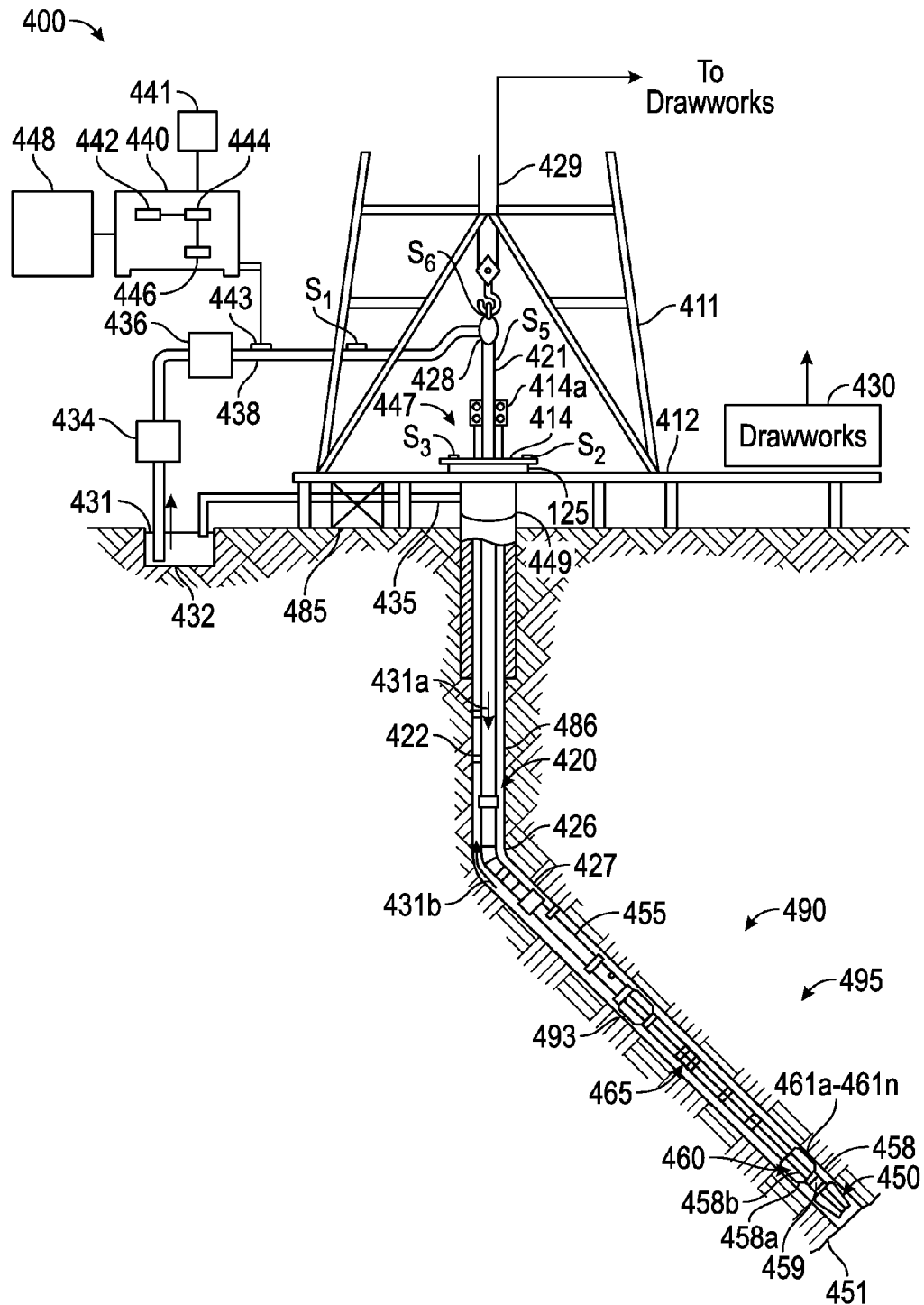
FIG. 4 is a schematic diagram of an example drilling system in accordance with one embodiment of the disclosure.

FIG. 4 is a schematic diagram of an example drilling system 10 in accordance with embodiments of the disclosure. FIG. 4 shows a drill string 420 that includes a bottomhole assembly (BHA) 490 conveyed in a borehole 426. The drilling system 10 includes a conventional derrick 411 erected on a platform or floor 412 which supports a rotary table 414 that is rotated by a prime mover, such as an electric motor (not shown), at a desired rotational speed. A tubing (such as jointed drill pipe 422), having the BHA 490, attached at its bottom end extends from the surface to the bottom 451 of the borehole 426. A drill bit 450, attached to BHA 490, disintegrates the geological formations when it is rotated to drill the borehole 426. The drill string 420 is coupled to a drawworks 430 via a Kelly joint 421, swivel 428 and line 429 through a pulley. Drawworks 430 is operated to control the weight on bit ("WOB"). The drill string 420 may be rotated by a top drive (not shown) instead of by the prime mover and the rotary table 414. Alternatively, a coiled-tubing may be used as the tubing 422. A tubing injector 414a may be used to convey the coiled-tubing having the BHA attached to its bottom end. The operations of the drawworks 430 and the tubing injector 414a are known in the art and are thus not described in detail herein.

A suitable drilling fluid 431 (also referred to as the "mud") from a source 432 thereof, such as a mud pit, is circulated under pressure through the drill string 420 by a mud pump 434. The drilling fluid 431 passes from the mud pump 434 into the drill string 420 via a desurger 436 and the fluid line 438. The drilling fluid 431a from the drilling tubular discharges at the borehole bottom 451 through openings in the drill bit 450. The returning drilling fluid 431b circulates uphole through the annular space 427 between the drill string 420 and the borehole 426 and returns to the mud pit 432 via a return line 435 and drill cutting screen 485 that removes the drill cuttings 486 from the returning drilling fluid 431b. A sensor S1 in line 438 provides information about the fluid flow rate. A surface torque sensor S2 and a sensor S3 associated with the drill string 420 respectively provide information about the torque and the rotational speed of the drill string 420. Tubing injection speed is determined from the sensor S5, while the sensor S6 provides the hook load of the drill string 420.

Well control system 447 is placed at the top end of the borehole 426. The well control system 447 includes a surface blow-out-preventer (BOP) stack 415 and a surface choke 449 in communication with a wellbore annulus 427. The surface choke 449 can control the flow of fluid out of the borehole 426 to provide a back pressure as needed to control the well.

In some applications, the drill bit 450 is rotated by only rotating the drill pipe 422. However, in many other applications, a downhole motor 455 (mud motor) disposed in the BHA 490 also rotates the drill bit 450. The rate of penetration (ROP) for a given BHA largely depends on the WOB or the thrust force on the drill bit 450 and its rotational speed.

A surface control unit or controller 440 receives signals from the downhole sensors and devices via a sensor 443 placed in the fluid line 438 and signals from sensors S1-S6 and other sensors used in the system 10 and processes such signals according to programmed instructions provided to the surface control unit 440. The surface control unit 440 displays desired drilling parameters and other information on a display/monitor 441 that is utilized by an operator to control the drilling operations. The surface control unit 440 may be a computer-based unit that may include a processor 442 (such as a microprocessor), a storage device 444, such as a solid-state memory, tape or hard disc, and one or more computer programs 446 in the storage device 444 that are accessible to the processor 442 for executing instructions contained in such programs. The surface control unit 440 may further communicate with a remote control unit 448. The surface control unit 440 may process data relating to the drilling operations, data from the sensors and devices on the surface, and data received from downhole; and may control one or more operations of the downhole and surface devices. The data may be transmitted in analog or digital form.

The BHA 490 may include a tool 400 configured for performing transient electromagnetic (TEM) measurements. The BHA 490 may also contain other formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 495 surrounding the BHA 490. For convenience, all such sensors are generally denoted herein by numeral 465. The BHA 490 may further include a variety of other sensors and devices 459 for determining one or more properties of the BHA 490, such as vibration, bending moment, acceleration, oscillations, whirl, stick-slip, weight-on-bit, fluid flow rate, pressure, temperature, rate of penetration, azimuth, tool face, drill bit rotation, etc.

The BHA 490 may include a steering apparatus or tool 458 for steering the drill bit 450 along a desired drilling path. In one aspect, the steering apparatus may include a steering unit 460, having a number of force application members 461a-461n. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 458 having a bent sub and a first steering device 458a to orient the bent sub in the wellbore and the second steering device 458b to maintain the bent sub along a selected drilling direction. The steering unit 458, 460 may include near-bit inclinometers and magnetometers.

The drilling system 10 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the BHA downhole. In such applications a thruster may be deployed in the drill string 420 to provide the required force on the drill bit.

Exemplary sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 10 can include one or more downhole processors at a suitable location such as 493 on the BHA 490. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 442 can process the surface measured data, along with the data transmitted from the downhole processor, to evaluate the formation. While a drill string 420 is shown as a conveyance device for tool 400, it should be understood that embodiments of the present disclosure may be used in connection with tools conveyed via rigid (e.g. jointed tubular or coiled tubing) as well as non-rigid (e.g. wireline, slickline, e-line, etc.) conveyance systems. The drilling system 10 may include a bottomhole assembly and/or sensors and equipment for implementation of embodiments of the present disclosure on either a drill string or a wireline.

A point of novelty of the system illustrated in FIG. 4 is that the surface processor 442 and/or the downhole processor 493 are configured to perform certain methods (discussed below) that are not in the prior art. Surface processor 442 or downhole processor 493 may be configured to control steering apparatus 458, mud pump 434, drawworks 430, rotary table 414, downhole motor 455, other components of the BHA 490, or other components of the drilling system 10. Surface processor 442 or downhole processor 493 may be configured to control sensors described above and to estimate a property of the earth formation according to methods described herein.

Control of these components may be carried out using one or more models using methods described below. For example, surface processor 442 or downhole processor 493 may be configured to modify drilling operations i) autonomously upon triggering conditions, ii) in response to operator commands, or iii) combinations of these. Such modifications may include changing drilling parameters, steering the drillbit (e.g., geosteering), and so on. Control of these devices, and of the various processes of the drilling system generally, may be carried out in a completely automated fashion or through interaction with personnel via notifications, graphical representations, user interfaces and the like. Reference information accessible to the processor may also be used. In some general embodiments, surface processor 442, downhole processor 493, or other processors (e.g., remote processors) may be configured to operate the TEM tool 400 to induce and measure TEM signals.

Returning to FIG. 1B, tool 100' includes a tubular 130' substantially entirely comprised of a reduced conductivity material. The tool includes a transmitter 110 and a single receiver 120' disposed along tubular 130'.

Referring to FIG. 1C, tool 100" includes a tubular 130 comprised of steel or other resistive material. The tubular is provided with a localized insert 135 comprised of reduced conductivity material. Tool 100" may include a transmitter 110 and receivers 120 and 125 disposed along tubular 130". In FIG. 1C, transmitter 110 receivers 120 and 125 are disposed on the same insert 135. Other embodiments may include a plurality of inserts, with transmitter 110 disposed on a first insert and receivers 120 and 125 sharing a second insert, or alternatively, each receiver having a corresponding insert. Further implementations may use a set of inserts axially surrounding transmitter 110 and receivers 120 and 125, alone or collectively.

FIG. 5 illustrates a method 500 for estimating a property of the earth formation in accordance with embodiments of the present disclosure. Transient calibration measurements are made 501 in a homogenous zone such as in air (i.e., with no formation around) and two signals $C_1(t)$ and $C_2(t)$ are received in the receivers R1 and R2. At step 503, a time-dependent coefficient $$K(t)=C_2(t)/C_1(t) \qquad (1)$$

is calculated using a processor. (Alternatively, the bucking coefficient can be estimated according to the formula: $K(t)=r_2^3/r_1^3$, where $r_1$, $r_2$-distances between transmitter and first and a second receiver correspondingly).

Steps 501 and 503 comprise a bucking mode. At step 505, downhole transient measurements are made and two signals $S1(t)$ and $S2(t)$ are acquired. Next, a processor is used to process the two signals $S1(t)$ and $S2(t)$ to estimate the differential (bucked) signal is carried out at step 507 according to the equation $$\Delta S(t)=S_2(t)-K(t) \cdot S_1(t). \qquad (2)$$

Steps 505 and 507 constitute the main operational mode. Next, an inversion of the differential (bucked) signal $\Delta S(t)$ is done at step 509 giving a result that is substantially unaffected by the conductive pipe to find values of properties of the surrounding formation (e.g., resistivity properties). The property for which a value is estimated may include a formation resistivity, a formation conductivity, a formation dielectric constant, a distance to an interface such as water-oil contact, and/or a distance to an interface ahead of the drill formation. In the case of a two-coil (non-bucking) arrangement, steps 501 and 503 are not needed. Thus, K(t)=0. Optional step 511 may include modifying drilling operations in the borehole (e.g., geosteering) dependent upon one or more estimated values of the formation property (e.g., distance to interface).

FIG. 6 illustrates a method for making a transient measurement in accordance with embodiments of the present disclosure. Optional step 605 of the method 600 may include performing a drilling operation in a borehole. For example, a drill string may be used to form (e.g., drill) the borehole. Optional step 610 may include conveying a TEM tool 600 having a reduced conductivity tubular in the borehole on a conveyance device. For example, a tool (e.g., tool 100) may be conveyed on the drill string.

Step 620 of the method 600 includes inducing a time-dependent current in the formation. This may be carried out by abruptly changing a magnetic moment of a transmitter in the borehole. Step 630 of the method 600 includes measuring a time-dependent transient electromagnetic (TEM) signal induced by the formation responsive to the current, which produces a TEM measurement. The signal may be generated in the receiver (or indicative of the signal generated in the receiver) and caused by the formation responsive to the current.

Mathematical models, look-up tables, neural networks, or other models representing relationships between the signals and the values of the formation properties may be used to characterize the drilling operation, optimize one or more drilling parameters of a drilling operation, change direction of drilling, or otherwise modify drilling operations in the borehole. The system may carry out these actions through notifications, advice, and/or intelligent control.

The term "conveyance device" or "carrier" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, and self-propelled tractors. "Tubular," as used herein, means one or more segments of tubular, including, for example, drill pipe, drill collar, mandrel and so on. "Reduced conductivity tubular" refers to a tubular including a reduced conductivity portion.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, a processor includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

Thus, configuration of the processor may include operative connection with resident memory and peripherals for executing programmed instructions. In some embodiments, estimation of the parameter of interest may involve applying a model. The model may include, but is not limited to, (i) a mathematical equation, (ii) an algorithm, (iii) a database of associated parameters, or a combination thereof.

By "substantially all," it is meant a majority portion sufficiently high to allow use of TEM signals generated in connection therewith to determine a value of a property of the formation ahead of the bit, examples of such a portion including, for example, at least 70 percent, at least 90 percent, at least 95 percent, at least 99 percent, at least 99.9 percent, and so on, up to an including the entirety of the tubular.

The term "predominantly" relates to an amount of current induced in a depth of investigation in the earth formation relative to an amount of current induced in another depth in the earth formation. A predominantly greater amount of current induced in the depth of interest will provide a response of electromagnetic energy that can be related to a property of the earth formation at the depth of investigation. As used herein, the term "predominantly" relates at least to a minimum amount of increase in currents induced at the depth of investigation with respect to other depths, the minimum amount being necessary to be able to estimate a property of the earth formation at the depth of investigation from the response.

While the present disclosure is discussed in the context of a hydrocarbon producing well, it should be understood that the present disclosure may be used in any borehole environment (e.g., a water or geothermal well).

The present disclosure is susceptible to embodiments of different forms. There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

We claim:

1. An apparatus for evaluating an earth formation intersected by a borehole, the apparatus comprising:
   a carrier configured to be conveyed in a borehole, the carrier including a conducting tubular;
   at least one transmitter on the conducting tubular configured to induce a current in the earth formation upon activation in the borehole;
   at least one receiver on the conducting tubular configured to receive a corresponding transient signal induced by the earth formation responsive to the current; and
   at least one processor configured to:
      estimate a value of a resistivity property of the earth formation using the corresponding transient signal responsive to a transient activation of the at least one transmitter antenna; and
   wherein the conducting tubular comprises a reduced conductivity portion adjacent to (i) the at least one transmitter antenna, and (ii) the at least one receiver antenna, and
   wherein the reduced conductivity portion comprises a reduced conductivity material having a resistivity between $10^{-4}$ ohm-meters and $10^2$ ohm-meters.

2. The apparatus of claim 1 wherein the reduced conductivity material is configured to operate in the borehole at a 1600 kN operating tensile load and a 65 kN torsional load.

3. The apparatus of claim 1 wherein the reduced conductivity material is configured to operate in the borehole at an internal pressure of at least 65 mPa and a temperature of 150 degrees Celsius.

4. The apparatus of claim 1 wherein the reduced conductivity material is anisotropic with regard to resistivity.

5. The apparatus of claim 1 wherein the reduced conductivity material is a composite material.

6. The apparatus of claim 5 wherein the reduced conductivity material comprises at least one of: i) carbon fibers; and ii) carbon tapes.

7. The apparatus of claim 1 wherein the reduced conductivity material is non-metallic.

8. The apparatus of claim 1 wherein the resistivity property of the earth formation is selected from: (i) a resistivity of the formation, (ii) a conductivity of the formation, and (iii) a dielectric constant of the formation.

9. The apparatus of claim 1 wherein:
   the carrier further comprises a bottomhole assembly including a drill bit;
   the resistivity property of the earth formation comprises a distance to an interface in the earth formation, and the at least one processor is further configured to control a direction of drilling of the bottomhole assembly using the estimated value of the distance to the interface.

10. The apparatus of claim 9 wherein the at least one processor is further configured to estimate the resistivity property for a portion of the earth formation ahead of the drill bit.

11. The apparatus of claim 1 wherein the at least one processor is further configured to estimate the value of the resistivity property of the earth formation by performing an inversion using a 1-D model without using a representation of the conducting tubular.

12. The apparatus of claim 1 wherein the reduced conductivity portion comprises substantially all of the conducting tubular.

13. The apparatus of claim 1 wherein the reduced conductivity portion comprises at least one insert on the conducting tubular.

14. The apparatus of claim 13 wherein the at least one transmitter and the at least one receiver are placed on the same insert of the at least one insert.

15. The apparatus of claim 1 comprising at least two spaced-apart receiving antennas, wherein the at least one processor is configured to estimate the value of the resistivity property of the earth formation using first and second transient signals from a first one and a second one of the at least two spaced-apart receiver antennas, respectively, each responsive to a transient activation of the at least one transmitter antenna.

16. The apparatus of claim 15 wherein the at least one processor is further configured to estimate the resistivity property of the earth formation using first and second transient signals to derive a bucked signal substantially unaffected by the tubular.

17. A method for evaluating an earth formation intersected by a borehole, the method comprising:
   conveying a carrier in a borehole, the carrier including a conducting tubular having at least one transmitter and at least one receiver on the conducting tubular, wherein the conducting tubular comprises a reduced conductivity portion adjacent at least one of (i) the at least one transmitter antenna, and (ii) the at least one receiver antenna, the reduced conductivity portion comprising a reduced conductivity material having a resistivity between $10^{-4}$ ohm-meters and $10^2$ ohm-meters;
   inducing a current in the earth formation;
   receiving a corresponding transient signal induced by the earth formation responsive to the current; and
   using at least one processor to estimate a value of a resistivity property of the earth formation using the corresponding transient signal.

* * * * *